US008538897B2

(12) United States Patent
Han et al.

(10) Patent No.: US 8,538,897 B2
(45) Date of Patent: Sep. 17, 2013

(54) CROSS-TRACE SCALABLE ISSUE DETECTION AND CLUSTERING

(75) Inventors: Shi Han, Beijing (CN); Yingnong Dang, Beijing (CN); Shuo-Hsien (Stephen) Hsiao, Redmond, WA (US); Dongmei Zhang, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 254 days.

(21) Appl. No.: 12/960,015

(22) Filed: Dec. 3, 2010

(65) Prior Publication Data

US 2012/0143795 A1  Jun. 7, 2012

(51) Int. Cl.
*G06F 11/07* (2006.01)
*G06F 15/18* (2006.01)

(52) U.S. Cl.
USPC ............................... 706/12; 714/37

(58) Field of Classification Search
None
See application file for complete search history.

(56) References Cited

U.S. PATENT DOCUMENTS

| 5,168,554 | A | * | 12/1992 | Luke ............................. 715/209 |
| 5,442,740 | A | * | 8/1995 | Parikh ........................... 345/440 |
| 5,870,735 | A | * | 2/1999 | Agrawal et al. ...................... 1/1 |
| 6,057,839 | A | * | 5/2000 | Advani et al. ................. 715/784 |
| 6,338,159 | B1 | * | 1/2002 | Alexander et al. ............ 717/128 |
| 6,456,993 | B1 | * | 9/2002 | Freund ............................. 706/46 |
| 6,557,011 | B1 | * | 4/2003 | Sevitsky et al. ....................... 1/1 |
| 6,728,949 | B1 | * | 4/2004 | Bryant et al. ................. 717/127 |
| 6,850,920 | B2 | * | 2/2005 | Vetter ............................. 706/11 |
| 7,131,113 | B2 | * | 10/2006 | Chang et al. ................. 717/128 |
| 7,441,234 | B2 | * | 10/2008 | Cwalina et al. .............. 717/128 |
| 7,565,576 | B2 | * | 7/2009 | Seroff ............................. 714/27 |
| 8,161,548 | B1 | * | 4/2012 | Wan ................................ 726/22 |
| 2006/0259823 | A1 | * | 11/2006 | Sohm et al. ..................... 714/38 |
| 2007/0006174 | A1 | * | 1/2007 | Sohm et al. .................... 717/131 |
| 2007/0169101 | A1 | * | 7/2007 | Konersmann et al. ........ 717/170 |
| 2008/0155339 | A1 | * | 6/2008 | Lowe et al. ..................... 714/38 |
| 2008/0162272 | A1 | * | 7/2008 | Huang et al. .................... 705/11 |
| 2009/0055153 | A1 | * | 2/2009 | Bell et al. ........................ 703/21 |
| 2010/0318852 | A1 | * | 12/2010 | Zheng et al. .................... 714/37 |

FOREIGN PATENT DOCUMENTS

EP         0610581 A2    8/1994

OTHER PUBLICATIONS

Geimer M. et al., "A Parallel Trace-Data Interface for Scalable Performance Analysis", PARA 2006, LNCS 4699, pp. 398-408, 2007.*
Yuan C. et al., "Automated Known Problem Diagnosis with Event Traces", ACM EuroSys '06, pp. 375-388, Jun. 2006.*
Zaidman A. et al., "Managing trace data volume through a heuristical clustering process based on event execution frequency", IEEE CSMR '04, 2004.*

(Continued)

*Primary Examiner* — Jeffrey A Gaffin
*Assistant Examiner* — Dave Misir
(74) *Attorney, Agent, or Firm* — Lee & Hayes, PLLC

(57) ABSTRACT

Techniques and systems for cross-trace scalable issue detection and clustering that scale-up trace analysis for issue detection and root-cause clustering using a machine learning based approach are described herein. These techniques enable a scalable performance analysis framework for computing devices addressing issue detection, which is designed as a multiple scale feature for learning based on issue detection, and root cause clustering. In various embodiments the techniques employ a cross-trace similarity model, which is defined to hierarchically cluster problems detected in the learning based issue detection via butterflies of trigram stacks. The performance analysis framework is scalable to manage millions of traces, which include high problem complexity.

20 Claims, 9 Drawing Sheets

(56) References Cited

OTHER PUBLICATIONS

Kavalanekar S. et al., "Measuring database performance in online services: a trace-based approach", Performance Evaluation and Benchmarking, 2009.*

Julisch K., "Clustering Intrusion Detection Alarms to Support Root Cause Analysis", ACM Transactions on Information and System Security, vol. 6, No. 4, pp. 443-471, Nov. 2003.*

Noeth M. et al., "ScalaTrace: Scalable compression and replay of communication traces for high-performance computing", Journal of Parallel and Distributed Computing, 69, pp. 696-710, 2009.*

Reiss S., "Controlled Dynamic Performance Analysis", ACM WOSP '08, pp. 43-54, Jun. 2008.*

Biberstein, et al., "Trace-based Performance Analysis on Cell BE", retrieved on Aug. 10, 2010 at <<http://ieeexplore.ieee.org/stamp/stamp.jsp?tp=&arnumber=4510753>>, IEEE Computer Society, Proceedings of International Symposium on Performance Analysis of Systems and Software (ISPASS), 2008, pp. 213-222.

Cain, et al., "A Callgraph-Based Search Strategy for Automated Performance Diagnosis", retrieved on Aug. 10, 2010 at <<http://citeseerx.ist.psu.edu/viewdoc/download;jsessionid=CA09C1935285F0C7EB8B9B83A235B76A?doi=10.1.1.21.6223&rep=rep1&type=pdf>>, Springer-Verlag London, Lecture Notes in Computer Science—vol. 1900, Proceedings of International Euro-Par Conference on Parallel Processing, Munich, Germany, Aug. 2000, pp. 108-122.

Cantrill, et al., "Dynamic Instrumentation of Production Systems", retrieved on Aug. 10, 2010 at <<http://www.sun.com/bigadmin/content/dtrace/dtrace_usenix.pdf>>, USENIX Association, Proceedings of Annual Technical Conference, Boston, MA, 2004, pp. 1-14.

Cohen, et al., "Capturing, Indexing, Clustering, and Retrieving System History", retrieved on Aug. 10, 2010 at <<http://citeseerx.ist.psu.edu/viewdoc/download?doi=10.1.1.62.9909&rep=rep1&type=pdf>>, ACM SIGOPS Operating Systems Review (SOSP), Brighton, UK, vol. 39, No. 5, 2005, pp. 105-118.

Cohen, et al., "Correlating instrumentation data to system states: A building block for automated diagnosis and control", retrieved on Aug. 10, 2010 at <<http://www.ifp.illinois.edu/~iracohen/publications/OSDI2004.pdf>>, USENIX Association, Proceedings of Symposium on Opearting Systems Design and Implementation—vol. 62004, San Francisco, CA, 2004, pp. 1-14.

Eick, et al., "Displaying Trace Files", retrieved on Aug. 10, 2010 at <<http://homepage.mac.com/pauljlucas/resume/displaying_trace_files.pdf>>, John Wiley and Sons, Software—Practice and Experience, vol. 26, No. 4, Apr. 1996, pp. 399-409.

"Event Tracing", retrieved on Aug. 10, 2010 at <<http://msdn.microsoft.com/en-us/library/bb968803(VS.85).aspx>>, Microsoft Corporation, Jul. 2, 2010, pp. 1-3.

Freitag, et al., "A Dynamic Periodicity Detector: Application to Speedup Computation", retrieved on Aug. 10, 2010 at <<http://ieeexplore.ieee.org/stamp/stamp.jsp?tp=&arnumber=924923>>, IEEE Computer Society, Proceedings of International Parallel and Distributed Processing Symposium, 2001, pp. 1-6.

Fu, et al., "Exploring Event Correlation for Failure Prediction in Coalitions of Clusters", retrieved on Aug. 10, 2010 at <<http://citeseerx.ist.psu.edu/viewdoc/download?doi=10.1.1.122.8727&rep=rep1&type=pdf>>, ACM, Proceedings of Conference on Supercomputing (SC), Reno, Nevada, Article 41, 2007, pp. 1-12.

Hearst, "Support Vector Machines", retrieved on Aug. 10, 2010 at <<http://dx.doi.org/10.1109/5254.708428>>, IEEE Intelligent Systems, vol. 13, No. 4, 1998, pp. 18-28.

Julisch, "Mining Alarm Clusters to Improve Alarm Handling Efficiency", retrieved on Aug. 10, 2010 at <<http://citeseerx.ist.psu.edu/viewdoc/download?doi=10.1.1.5.7059&rep=rep1&type=pdf>>, IEEE Computer Society, Proceedings of Annual Computer Security Applications Conference (ACSAC), 2001, pp. 1-10.

Kavalanekar, et al., Characterization of Storage Workload Traces from Production Windows Servers, IEEE, 2008, 10 pages.

Knupfer, et al., "Construction and Compression of Complete Call Graphs for Post-Mortem Program Trace Analysis", retrieved on Aug. 10, 2010 at <<http://ieeexplore.ieee.org/stamp/stamp.jsp?tp=&arnumber=1488612>>, IEEE Computer Society, Proceedings of International Conference on Parallel Processing (ICPP), 2005, pp. 1-8.

Miller, et al., "The Paradyn Parallel Performance Measurement Tool", retrieved on Aug. 10, 2010 at <<http://www.cs.umd.edu/~hollings/papers/computer95.pdf>>, IEEE Computer Society Press, Computer, vol. 28, No. 11, 1995, pp. 37-46.

Mirgorodskiy, et al., "Problem Diagnosis in Large-Scale Computing Environments", retrieved on Aug. 10, 2010 at <<http://citeseerx.ist.psu.edu/viewdoc/download?doi=10.1.1.124.4526&rep=rep1&type=pdf>>, IEEE, Proceedings of Conference on Supercomputing (SC), Tampa, Florida, 2006, pp. 1-13.

Nickolayev, et al., "Real-time Statistical Clustering for Event Trace Reduction", retrieved on Aug. 10, 2010 at <<http://citeseerx.ist.psu.edu/viewdoc/download?doi=10.1.1.37.205&rep=rep1&type=pdf>>, International Journal of High Performance Computing Applications, vol. 11, No. 2, 1997, pp. 69-80.

"Optimization and Tuning for Intel Processors", retrieved on Aug. 10, 2010 at <<http://www.lrz.de/services/compute/linux-cluster/tuning/>>, Leibniz Supercomputer Centre, Jan. 25, 2010, pp. 1-10.

Park, et al., "Improve Debugging and Performance Tuning with ETW", retrieved on Aug. 10, 2010 at <<http://msdn.microsoft.com/en-us/magazine/cc163437.aspx>>, Microsoft Corporation, Apr. 2007, pp. 1-12.

Reiss, "Controlled Dynamic Performance Analysis", retrieved on Aug. 10, 2010 at <<http://www.cs.brown.edu/~spr/research/dyvise/dyper.pdf>>, ACM, Proceedings of International Workshop on Software and Performance (WOSP), Princeton, New Jersey, Jun. 2008, pp. 43-54.

Rohlf, Adaptive Hierarchical Clustering Schemes, Systematic Zoology, 1970, 19, pp. 58-82.

"SpyKer Pro v2.0", retrieved on Aug. 10, 2010 at <<http://www.lynuxworks.com/products/spyker/spyker-pro.pdf>>, LynuxWorks, 2004, pp. 1-2.

"Using Xperf to Take a Trace, Pigs Can Fly", retrieved on Aug. 10, 2010 at <<http://bandwidthco.com/whitepapers/compforensics/binary/windows/Using%20Xperf%20to%20Take%20a%20Trace.pdf>>, white paper, Mar. 2, 2008, pp. 1-13.

Vetter, "Performance Analysis of Distributed Applications using Automatic Classification of Communication Inefficiencies", retrieved on Aug. 10, 2010 at <<http://citeseerx.ist.psu.edu/viewdoc/download?doi=10.1.1.25.2888&rep=rep1&type=pdf>>, ACM International Conference on Supercomputing, Santa Fe, NM, 2000, pp. 1-10.

Wolf, et al., "Automatic Performance Analysis of Hybrid MPI/OpenMP Applications", retrieved on Aug. 10, 2010 at <<http://ieeexplore.ieee.org/stamp/stamp.jsp?tp=&arnumber=1183560>>, IEEE Computer Society, Proceedings of Euromicro Conference on Parallel, Distributed and Network-Based Processing (Euro-PDP), 2003, pp. 1-10.

Yuan, et al., "Automated Known Problem Diagnosis with Event Traces", retrieved on Aug. 10, 2010 at <<http://www.cs.cmu.edu/~nlao/publication/older/p375-yuan.pdf>>, ACM, Proceedings of EuroSys Conference, 2006, pp. 375-388.

Zhang, et al., "Ensembles of Models for Automated Diagnosis of System Performance Problems", retrieved on Aug. 10, 2010 at <<http://ieeexplore.ieee.org/stamp/stamp.jsp?tp=&arnumber=1467838>>, IEEE Computer Society, Proceedings of International Conference on Dependable Systems and Networks (DSN), 2005, pp. 1-10.

* cited by examiner

US 8,538,897 B2

CROSS-TRACE SCALABLE ISSUE DETECTION AND CLUSTERING

BACKGROUND

Traditionally, domain experts manually analyze event traces to diagnose performance issues when a computer system becomes slow or non-responsive. Such human interaction limits the effectiveness of trace analysis because manual trace-by-trace analysis is expensive and time consuming. In addition, manual trace-by-trace analysis does not scale-up to the millions of traces available, such as from software vendors.

Typically an analyst must be a domain expert, and even such experts cannot efficiently analyze and pass change requests to developers. For example, upon receiving an event trace, the analyst must identify a problem in the trace, infer a cause of the problem, scan a database of known issues and root causes, and when a match is found, forward a change request to a developer. However, when no match is found, the analyst will undertake even more expensive interaction by looking deep into the trace and corresponding source code to identify a root cause of the problem. The analyst will then submit a fix request to a developer and append the new issue and root cause to the database of known issues and root causes. While the analyst may be very good, the analyst still must look at each event trace received in order to request a fix. In addition, because the traces causing the most problems do not rise to the surface, the analyst, and hence the developer, may be working on a problem that causes a minor annoyance while a seriously disruptive problem waits for attention.

SUMMARY

Described herein are techniques and corresponding systems implementing techniques that scale-up trace analysis using a machine learning based approach to issue detection and root-cause clustering. These techniques enable a scalable performance analysis framework for computer systems addressing issue detection and clustering. The techniques include a multiple scale feature for learning based issue detection and root-cause clustering. The root-cause clustering employs a cross-trace similarity model, which is defined to hierarchically cluster problems detected in the learning based issue detection via a trigram stack. The performance analysis framework is scalable to manage millions of traces, which in some instances are each more than about 200 MB in binary form or about 2 GB in textual form and include high problem complexity.

This Summary is provided to introduce a selection of concepts in a simplified form that are further described below in the Detailed Description. This Summary is not intended to identify key or essential features of the claimed subject matter; nor is it to be used for determining or limiting the scope of the claimed subject matter.

BRIEF DESCRIPTION OF THE DRAWINGS

The detailed description is set forth with reference to the accompanying figures. In the figures, the left-most digit(s) of a reference number identifies the figure in which the reference number first appears. The same numbers are used throughout the drawings to reference like features and components.

DETAILED DESCRIPTION

Overview

Figure 1:
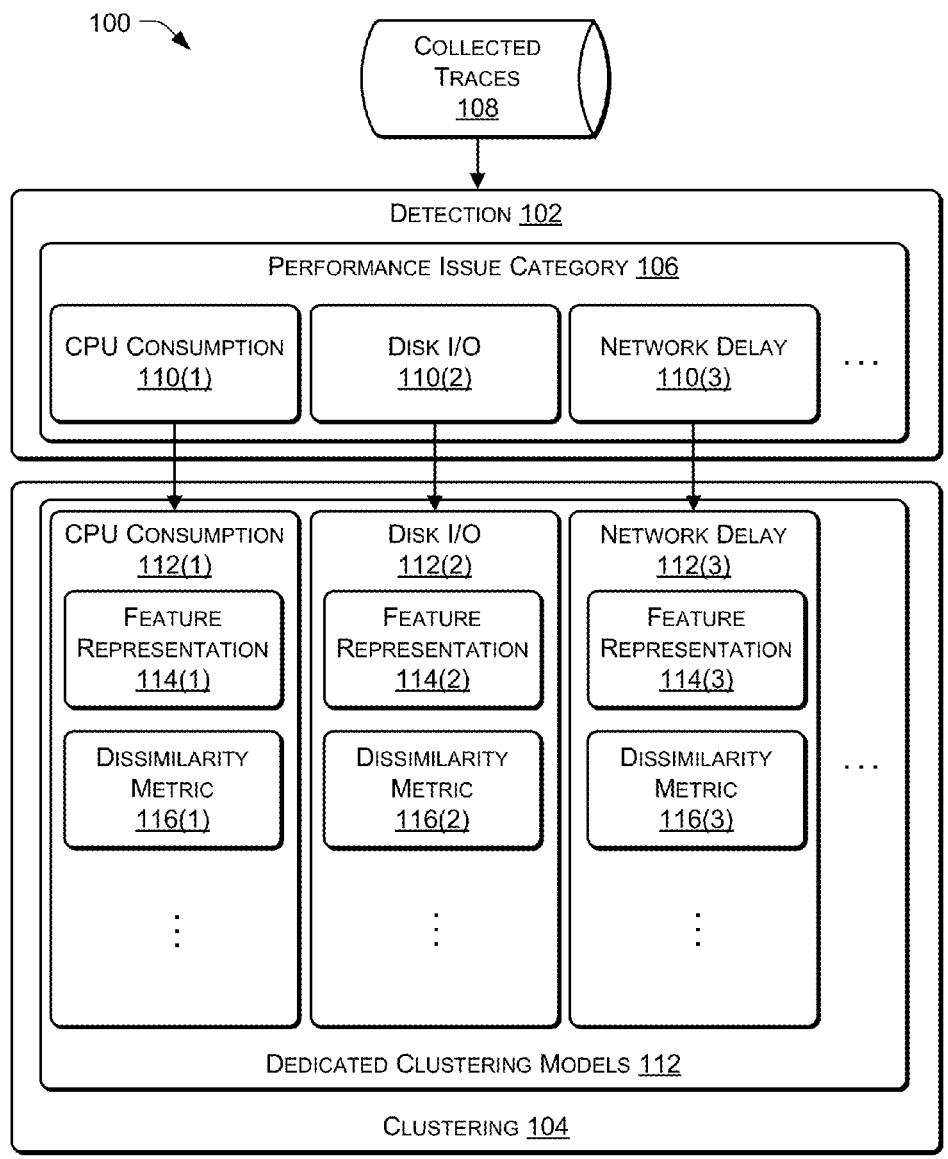
FIG. 1 illustrates an example two-layer framework for cross-trace scalable issue detection and clustering according to some implementations.

The disclosure describes technologies that are generally directed towards cross-trace scalable issue detection and clustering. Some implementations provide a device and/or application-specific scale-up trace analysis using a machine learning based approach to issue detection and root-cause clustering for various applications on computing devices. Scalable trace analysis may be implemented to deal with problems that arise due to the saturation of computing devices in our environment. For example, operating systems (OS) for personal computers, e.g. Microsoft™ Windows®, Mac™ OS, and Linux™, are nearly ubiquitous. They are not only used on personal computers, but also serve as the underlying OS for many distributed systems. In addition mobile versions of such operating systems are found in a myriad of mobile computing devices. As these systems have become increasingly large and complicated, and the applications running on top of them continue to grow, it has become increasingly difficult to complete effective performance testing with adequate event coverage in test labs.

Performance issues have a negative impact on user experience. For example, a program may suddenly stop responding to user interaction and exhibit an unresponsive graphical presentation and a busy cursor. In other cases, even when users are doing little work with their computers, CPU usage may be abnormally high causing the CPU fan to spin excessively. In several implementations, cross-trace scalable issue detection and clustering, as described herein, may leverage traces from operating systems and applications collected from end users. Such traces may be obtained from operating systems and applications in both Beta release stage and release to manufacturing (RTM) release stage. In several implementations test lab traces are included in some instances. The various implementations address various performance issues such as CPU consumption, disk input/output (I/O), and/or network delay. Conducting performance analysis on the huge number of collected traces coming from millions of end user systems using the techniques described herein enables systematic improvement of the quality of the user experience as well as the respective operating systems and applications including their interoperability.

In various embodiments, the described techniques enable a scalable performance analysis framework for computer systems addressing issue detection, which is designed as a multiple scale feature for learning based issue detection and root-cause clustering. In several instances, the techniques employ a cross-trace similarity model, which is defined to hierarchically cluster problems detected in the learning based issue detection logic via a trigram stack. The performance analysis framework is scalable to manage millions of traces, which in some implementations each may be more than about 200 MB in binary form or about 2 GB in textual form and include high problem complexity.

The discussion below begins with a section entitled "Example Framework," which describes non-limiting logical environments that may implement the described techniques. Next, a section entitled "Example Models" presents several examples of models defined for and by cross-trace scalable issue detection and clustering. A third section, entitled "Example Processes" presents several example processes for cross-trace scalable issue detection and clustering. A fourth section, entitled "Example Architecture" describes one non-limiting logical architecture that may implement the described techniques. A brief conclusion ends the discussion.

This brief introduction, including section titles and corresponding summaries, is provided for the reader's convenience and is not intended to limit the scope of the claims, nor the proceeding sections.

Example Framework

Figure 3:
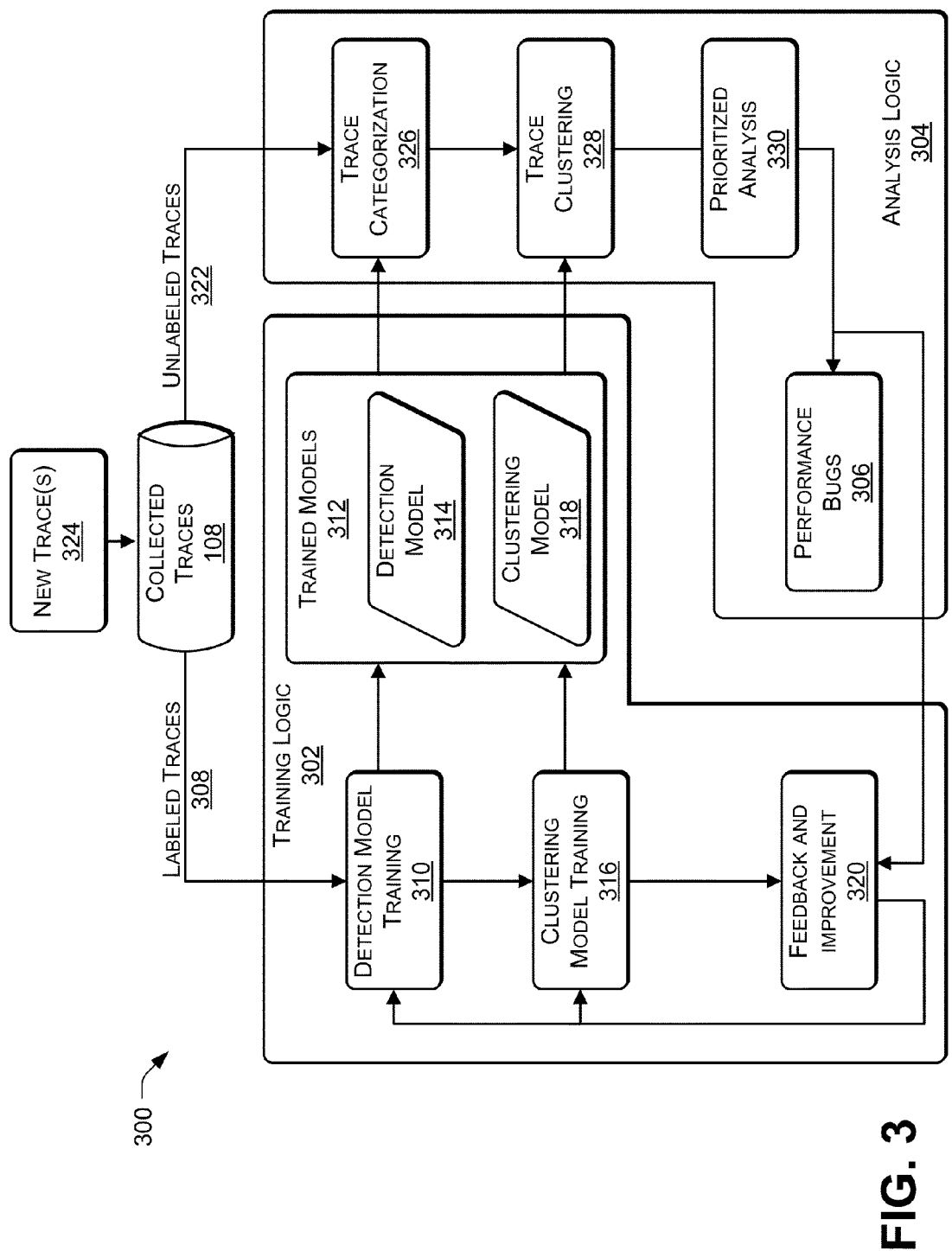
FIG. 3 illustrates an example machine training and analysis framework for cross-trace scalable issue detection and clustering according to some implementations.

In FIGS. 1 and 3 each block represents logic that can be implemented in hardware, software, or a combination thereof while arrows represent data-flow among the blocks. In the context of software, the blocks represent computer-executable instructions that, when executed by one or more processors, cause the processors to perform operations to implement the described logic. Generally, computer-executable instructions include routines, programs, objects, components, data structures, and the like that perform particular functions or implement particular abstract data types. The order in which the blocks are described is not intended to be construed as a limitation, and any number of the described operations can be combined in any order and/or in parallel to implement cross-trace scalable issue detection and clustering according to some implementations.

FIG. 1 is a block diagram of an example framework 100 for cross-trace scalable issue detection and clustering according to some implementations. Framework 100 includes detection logic 102 and clustering logic 104.

Performance issue categorization and root cause analysis from the huge number of events collected in trace data are highly complicated. The illustrated detection logic 102 includes performance issue category logic 106. From collected traces 108, the detection logic 102 detects one or more problems or performance issues in the traces, and the performance issue category logic 106 classifies the detected problems into appropriate performance issue categories 110 such as CPU consumption 110(1), disk input/output (I/O) 110(2), and/or network delay 110(3) and dozens of others, e.g., driver delay, lock contention, memory leak, power management, hardware issues, priority inversion, etc. Detection logic 102 may receive a performance issue report from an end user and may detect that the performance issue is caused by multiple factors in some instances. In addition, detection logic 102 may identify more than 200 different system event types such as those reported by instrumentations such as Event Tracing for Windows™ (ETW) and DTrace as created by Sun Microsystems™.

For each predefined performance issue category, a dedicated binary classifier (not shown) may be employed because the symptoms of the performance issues in the various categories may differ greatly. Thus, the performance issue category logic 106 uses a specifically designed feature set and binary classifier for each performance issue category 110.

In framework 100, clustering logic 104 includes dedicated clustering models 112 for each performance issue category 110, e.g. CPU consumption 112(1), disk input/output (I/O) 112(2), and/or network delay 112(3) that correspond to CPU consumption 110(1), disk input/output (I/O) 110(2), and/or network delay 110(3) from the detection logic 102. The clustering models 112 each include feature representation logic 114 and a dissimilarity metric 116. The feature representation logic 114 provides a representation of a trace in the context of a specific performance issue. Meanwhile, the dissimilarity metric 116 provides a measure of differences between two traces 108 classified in the same performance issue category 110.

Figure 2:
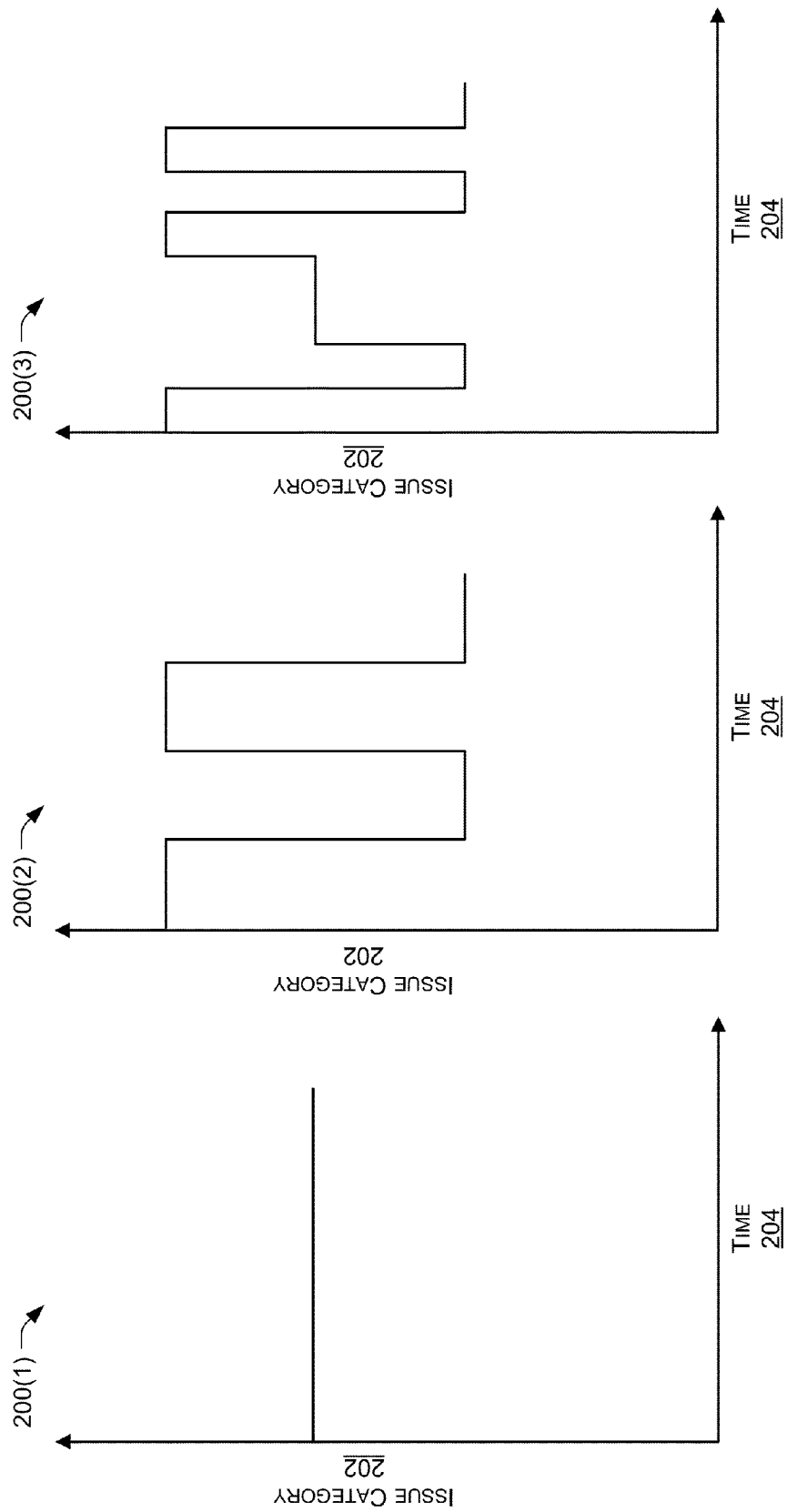
FIG. 2 illustrates three traces having the same issue category showing a common performance percentage in various patterns from an example implementation of cross-trace scalable issue detection and clustering.

FIG. 2 illustrates examples of three traces, 200(1), 200(2), and 200(3) having the same issue category 202, (e.g., CPU Usage, disk I/O, network delay, etc.), measured for equivalent periods of time 204 from an example implementation of cross-trace scalable issue detection and clustering. The traces 200 shown in FIG. 2 have a common performance percentage, although the resource use is illustrated with different patterns.

From the system perspective, performance issues may be of two high-level types, resource competition and resource consumption. The two types are not mutually exclusive. However, distinguishing between the two types facilitates performance of issue detection in several sub-types of each type. Generally speaking, resource competition causes the unsatisfied competitors to wait for an abnormally long time. Thus, resource competition may be detected from wait analysis or CPU starvation of the competitors. Meanwhile, resource consumption may be detected from the behavior of the resource, itself, such as the behavior of the CPU, itself On one hand, it is difficult to employ a purely rule-based approach, e.g., 100% CPU usage longer than about 1 second or greater than about 80% CPU usage longer than about 3 seconds, to quantify "unexpectedly high CPU usage" due to the myriad states of operating systems and applications. On the other hand, certain patterns related to CPU consumption may be hidden in the problematic traces. Cross-trace scalable issue detection and clustering leverages a learning based approach that employs data-driven techniques guided by domain knowledge to solve performance issue detection problems such as CPU consumption detection or disk I/O issue detection, network delay detection, etc.

Feature representation is an example of a key to successful clustering in the learning based approach to cross-trace scalable issue detection and clustering described herein. In the following example, CPU usage is the feature discussed. However, CPU usage is merely illustrative, and unless otherwise indicated, the implementations described herein should not be limited to CPU performance.

CPU usage is typically captured by sampling the CPU context at predetermined intervals. Several available instrumentation platforms such as ETW and DTrace, mentioned above, support this kind of sampling. For example, ETW samples each core every millisecond using the SampledProfile event. Although CPU context sampling may provide an approximation of CPU usage, the sampling frequency may not be high enough to depict the precise CPU usage for the purpose of CPU consumption detection. For example, if the consumption analysis is conducted at a 10-millisecond scale, then the precision of CPU usage measurement is only 10% using SampledProfile. In some instances measurement at a finer temporal scale may be used and can be obtained by capturing a context switch event. In the ETW instrumentation platform, CPU context switch is captured via the CSwitch event. Employing context switch events, which processes and which threads have CPU cycles are accurately recorded at any moment of time. Cross-trace scalable issue detection and clustering uses such CPU context switch information to calculate CPU usage that detection logic 102 uses to conduct the consumption detection.

In various implementations the detection logic 102 also takes other events into account, such as events for Interrupt Service Routine (ISR) and Delayed Procedure Call (DPC) provided by ETW or the corresponding events in other instrumentation platforms. Because ISR and DPC can occur within the context of idle processes, their associated time intervals are treated as busy instead of idle.

Significantly higher than expected CPU consumption may be detected from two different symptoms. First, a process may be constrained by limited CPU resources such that the process may not achieve better performance. Second, the CPU usage may be higher than expected, which may cause performance problems even though there is not CPU saturation.

The first symptom may be detected when the CPU usage is maximized during a relatively long period of time. Compared with the straightforward detection of maximized CPU usage, the second CPU consumption symptom is more subtle, thus higher than expected CPU usage without CPU saturation may be more difficult to detect. Multi-core systems further complicate detection of higher than expected CPU usage without CPU saturation. As an example, during the testing of one implementation, the CPU usage of a quad-core system showed that none of the four cores was being fully utilized. However, when checking the CPU usage of processes, the techniques of cross-trace scalable issue detection and clustering determined that one of the processes substantially constantly consumed about 25% of the CPU resources, which is equivalent to the full usage of a single core. In fact, a detailed examination of the trace revealed that the worker thread of that process was in a running status almost all the time, and it was scheduled on each of the four cores. This test demonstrates an example of why cross-trace scalable issue detection and clustering includes usage statistics of processes as well as CPU usage of cores when detecting CPU consumption issues.

As another example, the usage of both cores in a dual-core system may be less than 50% for over 70 seconds. However, further analysis from the trace may reveal that a process, e.g., OUTLOOK.EXE, sends requests to another process, e.g., lsass.exe, to acquire credential data. Process lsass.exe conducts CPU-intensive encryption work. Thus, when OUTLOOK.exe does not get the requested data, it repeatedly sends the request, which causes the CPU usage to be higher than expected. As yet another example, a single process may be consuming 8% of the CPU resources, and although 8% is not itself a significant amount, it may still be considered higher than expected for this specific process, thereby signifying a potential performance issue. When the 8% consuming process is on a single-core system, the potential for performance problems negatively impacting user experience may be significantly increased similar to the example of a process being scheduled on each of multiple cores.

As discussed earlier, although experienced system analysts may be able to identify CPU consumption issues in individual traces, it is difficult to utilize a rule-based approach to specify the thresholds for CPU usage percentage and duration when analyzing large numbers of traces with various root causes, such as root causes of the CPU consumption problem. Therefore, cross-trace scalable issue detection and clustering takes into account parameters, such as the CPU usage amount and duration, to define a feature representation that can be used for detecting CPU consumption issues, e.g., 114(1). Cross-trace scalable issue detection and clustering learns patterns of such parameters from labeled training data during classifier training as described with regard to FIG. 3.

FIG. 3 is a block diagram of an example machine training and analysis framework 300 for cross-trace scalable issue detection and clustering according to some implementations. In FIG. 3, each block represents logic that can be implemented in hardware, software, or a combination thereof while arrows represent data-flow among the blocks. Framework 300 represents a semi-supervised learning system including training logic 302 and analysis logic 304. The framework 300 obtains a huge number (e.g., millions) of operating system and application traces 108 with performance issues. The traces 108 are collected from various sources including traces from end users (in both Beta release stage and RTM release stage) as well as test lab traces in some implementations to train detection and clustering models having logic such as those shown in FIG. 1. The output is performance bugs 306 identified from the analysis of traces 108.

Classifier training is controlled by training logic 302. The framework 300 takes a small number of labeled traces 308 as input to perform model training. Detection model training logic 310 learns feature parameters, such as usage amount and duration for detecting CPU consumption, from the labeled traces 308 via classifier training. As feature parameters are learned, they are incorporated into the trained models 312, particularly the issue detection model 314, as well as passed to the clustering model training logic 316. In various implementations the clustering model training logic 316 identifies root-causes of the issues detected by the detection model training logic 310. Although, in other implementations the root-cause identification may be controlled by the detection model training logic 310, or a separate root-cause identification training logic (not shown). The clustering model training logic 316 clusters the issues detected based on the issues having shared root-causes. As clusters are learned, they are incorporated into the trained models 312, particularly the clustering model 318, as well as passed to the feedback and improvement logic 320. The feedback and improvement logic 320, in turn, passes the clusters as output from the training logic 302 to the detection model training logic 310 and clustering model training logic 316 to improve future trained models 312. The feedback and improvement logic 320 also passes the performance bugs 306 from the analysis logic 304 to the detection model training logic 310 and clustering model training logic 316 to improve future trained models 312.

The trained models 312 are used in the analysis logic 304 to process the remaining unlabeled traces 322 from the huge number of collected traces 108 including new incoming traces 324. Unlabeled traces 322 are obtained by the trace categorization logic 326. Initially, the trace categorization logic 326 performs issue detection in accordance with issue detection logic 102 and then classifies the trace based on whether the trace is determined to represent a performance issue. For example, when the detected issue is CPU consumption, the trace categorization logic 326 classifies the trace depending on whether unexpectedly high CPU consumption is detected.

Traces having performance issues are passed to the trace clustering logic 328. The trace clustering logic 328 organizes the traces into clusters having a same or similar root-cause in accordance with clustering logic 104. The trace clustering logic 328 employs the clustering model 318 from the trained models 312 to refine the clusters.

Although in some instances automatic responses may be programmed in response to certain root-cause clusters signifying various issues. In some cases, human performance analysts will be used to further improve the models. In either instance, such analysis is prioritized 330. For example, instead of looking into individual traces collected, human performance analysts may look into the clustered traces produced by the trace clustering logic 328. Such analysis may be prioritized by the cluster size, i.e., the clusters with higher number of traces may be reviewed with higher priority. In various implementations, for each cluster, the performance analysts do not generally look into each individual traces one by one. Instead, during prioritized analysis 330, only a small set of traces from a cluster are investigated to confirm the root cause extracted by the automatic algorithm because each of the traces in a cluster share the same or similar root cause. Results of the prioritized analysis 330 are provided as the output performance bugs 306 and forwarded to the feedback and improvement logic 320 for inclusion in the training logic 302.

Given a trace A, the dedicated clustering models 112 define the function $U_{A,\eta}(t) \to [0,1]$ as the CPU resource usage over time t, where $\eta$ represents a specific processor core or process, i.e. $\eta \in \{C_i: \text{set of processor cores}\} \cup \{P_j: \text{set of processes}\}$. Based on the two parameters, usage percentage threshold $\phi_p$ and usage duration threshold $\phi_1$, a window-based descriptor is defined by equation 1:

$$B_{\varphi_p, \varphi_1}(U, t) = \begin{cases} 1, & \frac{1}{\varphi_1} \int_t^{t+\varphi_1} U(\tau) d\tau > \varphi_p \\ 0, & \text{otherwise.} \end{cases} \quad (1)$$

In Equation 1, B is the binary descriptor representing whether the average CPU usage is above a threshold $\phi_p$ and within a time window of duration $\phi_1$. B can be interpreted as a busy-or-not detector at time t; and it is a function of parameters $\phi_p$ and $\phi_1$. As a window is shifted along the entire curve of U to conduct a busy-or-not scanning, equation 2 is obtained:

$$C_{\phi_p, \phi_1}(U) = \int_0^{+\infty} B_{\phi_p, \phi_1}(U, t) dt \quad (2).$$

Equation 2 represents a 2-dimensional spectrum $\mathbb{C} = \{C_{\phi_p, \phi_1}\}$ over $(\phi_p, \phi_1) \in (0, 1] \times (0, +\infty)$. As a transform of U, $\mathbb{C}$ has the properties shown in Table 1.

TABLE 1

1. Shift invariant: $\mathbb{C}(U(t + \Delta)) = \mathbb{C}(U(t))$
2. Even: $\mathbb{C}(U(-t)) = \mathbb{C}(U(t))$
3. Shape identical: ( ) ( )
   $\mathbb{C}(U) = \mathbb{C}(V) \Leftrightarrow$
   V can be derived from U by only mirror and shift operations.

With the properties shown in Table 1, the 2-dimensional spectrum $\mathbb{C}$ discriminates among different patterns as shown in FIG. 2, even when the patterns have the same average CPU usage percentage. Among these different patterns, some might be considered normal while the others may signify a performance issue or problem. Using a data-driven approach, cross-trace scalable issue detection and clustering trains a classifier as a piece of the trained models 312 to differentiate between these traces and correctly detect CPU consumption issues.

In addition, the 2-dimensional spectrum $\mathbb{C}$ is naturally a multi-scale representation because different regions of the 2-dimensional spectrum $\mathbb{C}$ reflect the statistics at different time scales. For example, a busy CPU usage curve corresponds to a large $(\phi_p, \phi_1)$ region with high energy in the 2-dimensional spectrum $\mathbb{C}$. This characteristic enables the 2-dimensional spectrum $\mathbb{C}$ to describe the CPU usage at different levels of detail, as well as at a higher semantic level.

Due to the impact on CPU consumption detection, in this example, $U_C$ of the busiest processor core and $U_P$ of the busiest process are selected as input representing processors and processes to the detection logic 102 for CPU consumption. Therefore, $\mathbb{C}(U_C)$ and $\mathbb{C}(U_P)$, together form the CPU usage description of the given trace A. Based on the above analysis, the 2-dimensional spectrum $\mathbb{C}$ serves as an effective representation of CPU usage.

The representations discussed thus far have been in continuous form. However, they may be transferred into discrete form for practical use. The sum of bins may be used to approximate the integration, and a table may be used to approximate the two-dimensional spectrum. An example of a detailed implementation is summarized in Table 2.

TABLE 2

1. Define 10% as the unit of percentage space (0, 1] for $\phi_p$
2. Define 10 ms as the unit of duration space (0, +∞) for $\phi_1$
3. Define table $\tilde{\mathbb{C}}(k, l)$ where k and l cover the percentage space and the duration space, respectively. Each entry of $\tilde{\mathbb{C}}(k, l)$ is the average CPU usage between $k*10\%$ and $(k+1)*10\%$ for a duration of $l*10$ milliseconds.

The second dimension l, may be limited, for example, within [1, 1000], which means the busy-or-not scanning is performed using windows of lengths from 10 milliseconds to 10 seconds. The table may be unfolded to a vector and the two vectors $\tilde{\mathbb{C}}(U_C)$ and $(\tilde{\mathbb{C}}_P)$ concatenated to generate a 2000-dimensional vector as the feature representation of CPU usage. Various classifiers may be used to perform binary classification, and a supervised learning method may be used to conduct CPU consumption issue detection. In some implementations described herein the supervised learning method includes a support vector machine (SVM) although other methods, for example including decision trees and/or Gaussian process regression may be used in some instances.

Various OS, e.g., Windows™, Mac™ OS, and Linux™ and/or highly interactive or supportive applications, e.g., Internet Explorer, Microsoft Office, and other browsers and programs that cause slow or unresponsiveness during user interaction are considered to have performance issues or problems because the unresponsiveness is unexpected. In contrast, interrupted user interaction by computing intensive applications such as MATLAB may be expected and not signify a potential performance issue. Accordingly the root-causes of performance issues related to CPU consumption are analyzed by clustering logic 104 to determine whether system behavior is unexpected.

For example, the clock speed of CPUs in personal computers has been in the GHz range for several years. With such high-speed processors, the expected response time for performing common computer tasks may be from an instant to a few seconds. Therefore, a 10-second long 100% CPU usage may be considered unexpected. Such a delay may be detected by detection logic 102 as a sign of a significant resource consumption issue compared with normal usage. In cross-trace scalable issue detection and clustering the 100% CPU usage may be categorized by performance issue category logic 106 as a CPU consumption issue 110(1). Table 3 lists several undesired constraints that are effected within seconds of maximized CPU usage.

TABLE 3

1. Limited functionalities of the OS and/or applications are available to be accessed via user interaction;
2. A limited number of modules are able to be involved in the above functionalities;
3. A limited amount of source code is able to be executed in the above modules.

Based on the constraints illustrated in Table 3, trace categorization 326 may infer with high probability that loops exist in the control flow of instruction execution during the high CPU consumption period because it is unlikely for code made up solely of sequential execution and jumps to consume so many CPU cycles. In several implementations of framework 300, analysis of a large number (e.g., from about 200 to about 3000) ETW traces with CPU consumption issues verified the above inference. Hence, clustering logic 104 including the dedicated clustering model 112 for CPU consumption 112(1) may incorporate a feature representation 114(1) depicting the basic nature of CPU consumption issues as fragments of source code being executed repeatedly with a root-cause represented by the looping function.

Mapping such performance problems to the underlying source code facilitates code change requests to correct performance problems. Similarly, clustering traces on the function facilitates code change requests to correct performance problems since a function is a natural unit from the programming language perspective.

Accordingly, trace clustering 328 may operate based on the lemma shown in Table 4.

TABLE 4

1. There exists at least one function being called repeatedly;
2. Or, there exists at least one function containing a loop of primitive operations.

Clustering logic 104 employs a function based feature representation 114 named Butterfly that effectively reflects the root cause of performance issues such as CPU consumption issues as summarized in Table 4. In additional embodiments performance issues reflected may include issues with disk I/O, network delay, etc. Dissimilarity metric 116, e.g., 116(1) defines a similarity/dissimilarity measure for trace comparison using the Butterfly representation. Trace clustering 328 provides traces with CPU consumption issues clustered based on different root causes using Butterfly and the similarity measure.

Example Models

A trigram stack reflecting the root-causes of performance issues such as the example CPU consumption issues shown serves as a basic building block for feature representation by clustering logic 104. In various implementations the trigram stack is created based on a CPU usage tree, and a Butterfly model is created using the trigram stacks to represent traces for clustering by trace clustering 328. A CPU usage tree that may be used to reflect overall CPU usage within a time period is defined according to Table 5.

TABLE 5

1. A virtual root node at level-0 with a total of 100% CPU resource;
2. Each node at level-1 represents a process with its total CPU usage as an attribute;
3. Level-2 nodes are the functions where threads start. From level-2 down the tree, each node represents a function with its total CPU usage as an attribute. The parent-child relationship of nodes indicates a function call, i.e. the parent calls the children.

For example, a CPU usage tree may be derived from the SampledProfile events in ETW traces by aggregating the call stacks and accumulating the corresponding CPU usage. Since the tree represents the overall CPU usage of a trace, the tree may be used as a feature to correlate different traces.

In one approach, a trace-wise dissimilarity measure may be based on the normalized edit distance of CPU usage tree, and trace clustering may be conducted using this dissimilarity metric. However, because the CPU usage tree is a global feature, it does not effectively represent root-causes. As a result, the CPU usage tree does not effectively reflect correlation of root-causes across different traces as desired for the dissimilarity metric. In addition, the calculation of edit distance on unordered trees is of nondeterministic polynomial time (NP) complexity.

In various implementations of cross-trace scalable issue detection and clustering, local features are designed to get closer to the root-causes of performance issues such as CPU consumption. For example, for a certain function F, clustering logic 104 examines the neighborhood in the CPU usage tree local to F and obtains a three-layer sub-tree called a trigram stack and shown in FIG. 4.

Figure 4:
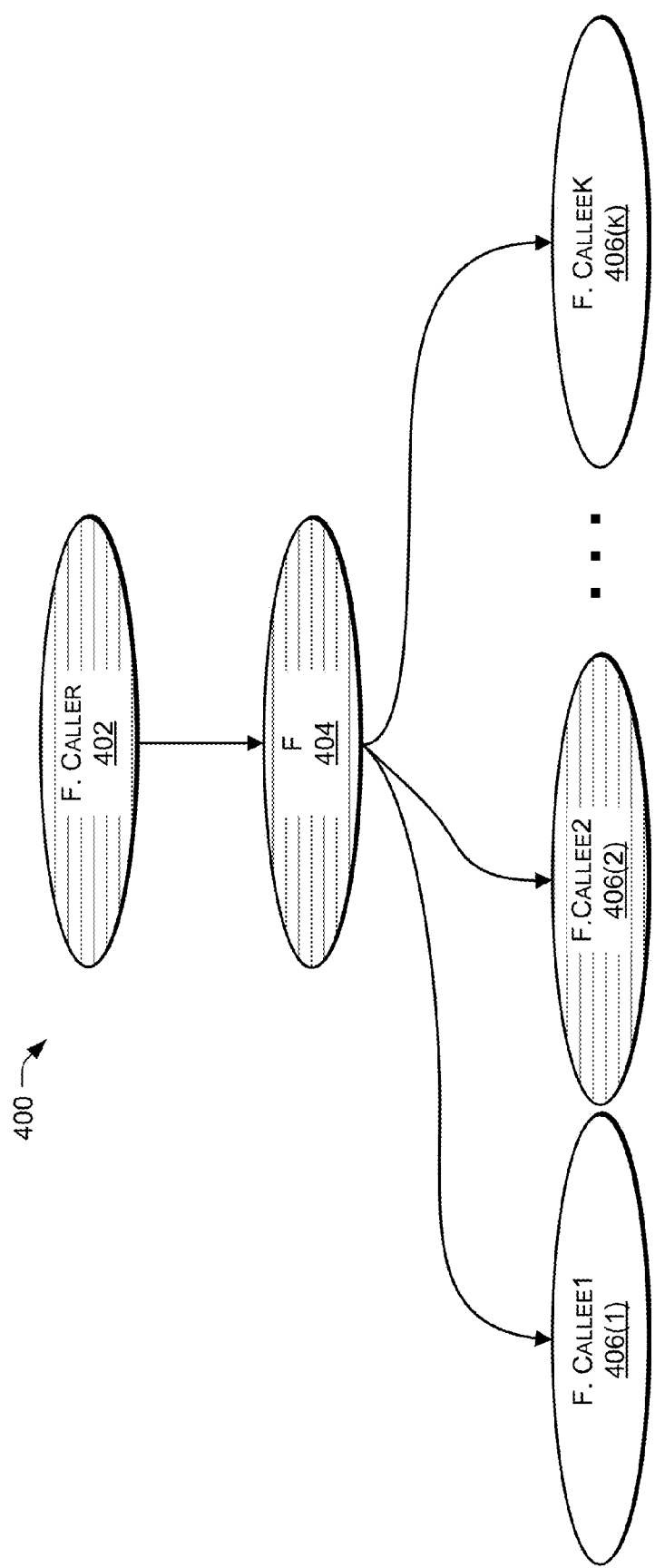
FIG. 4 illustrates an example of a trigram stack as employed by cross-trace scalable issue detection and clustering according to some implementations.

FIG. 4 illustrates an example of a trigram stack 400 as employed by cross-trace scalable issue detection and clustering according to some implementations. In trigram stack 400, F.Caller shown at 402 represents a function calling function F, which is shown at 404. Meanwhile shown F.Callee1 shown at 406(1), F.Callee2 shown at 406(2), and others up to F.CalleeK shown at 406(K) represent the functions called by function F.

The number of function calls F makes to each of its callees may be used to identify the path with the highest function call frequency and to locate the root-cause accordingly in some embodiments. However, ETW and other current instrumentation platforms do not track the entrance and exit of function calls. Accordingly, in various implementations, since the number of callees of F may vary, trace clustering logic 328 selects the callee among the children of function F that has the highest CPU consumption to enable comparison across traces. This approach results in a trigram stack with the path with the highest function call frequency highlighted as shown by the hatching of nodes 402, 404, and 406(2) in the stack 400 of FIG. 4. In addition, the approach results in a 6-dimensional vector as shown in Equation 3.

$$T(F) = (A, B, C, \alpha, \beta, \gamma) \\ = \left(F.Caller, F, F.CalleeM, \frac{F \cdot Usage}{F.Caller \cdot Usage}, F \cdot Usage, \frac{F.CalleeM \cdot Ussage}{F \cdot Usage}\right). \tag{3}$$

In Equation 3, F.CalleeM represents the top CPU consumer. As an example, F.Callee2, shown at 406(2), represents the top CPU consumer callee of function F in FIG. 4.

F, shown at 404, being repeatedly called by F.Caller, shown at 402, is not sufficient for the trigram shown in FIG. 4 to represent the root-cause of a CPU consumption issue. Table 6 presents this statement formally.

TABLE 6

1. CPU usage of F is relatively high, i.e. $\beta$ is relatively large;
2. F.Usage is dominant of F.Caller.Usage, i.e., $\alpha \to 1$.

The conditions of Table 6 are not sufficient to represent the root-cause because other ancestor nodes of F, 404, besides F.Caller, 402, may also meet the conditions of the statement in Table 6. In order for the trigram to illustrate the root cause, the repeated function call may only occur between F.Caller, 402, and F, 404.

In the following discussion, T denotes the trigram stack feature. In addition, T is used as the basic unit to create root-cause representation for traces and to define similarity measure across traces as described herein. A node F may be distinguished as the root-cause from its ancestor nodes as shown by the following three, non-exclusive, examples.

In the first example, F is the end or leaf node, i.e., F has no callees. Since F does not have any callees, the field C in T is set to null and $\gamma$ is equal to 0. Consequently, in the first example, $\gamma \ll 1$.

In the second example, F has multiple callees similar to the trigram stack shown in FIG. 4. If none of F.Callees is the root-cause, then the total amount of CPU usage of these callees may be a small portion of F.Usage. Consequently, in the second example, $\gamma \ll 1$.

In the third example, F is a wrapper function or interface. The third example is shown in stack 500 of FIG. 5. If F, shown at 502, and G, shown at 504 through L, shown at 506, are simply wrapper functions or interface functions, then the CPU usage of these functions may be insignificant enough to be ignored. Consequently, in the third example, $T(F).\gamma \approx T(G).\gamma \approx \ldots \approx T(L).\gamma \approx 1$ and $T(M).\gamma \ll 1$.

Figure 5:
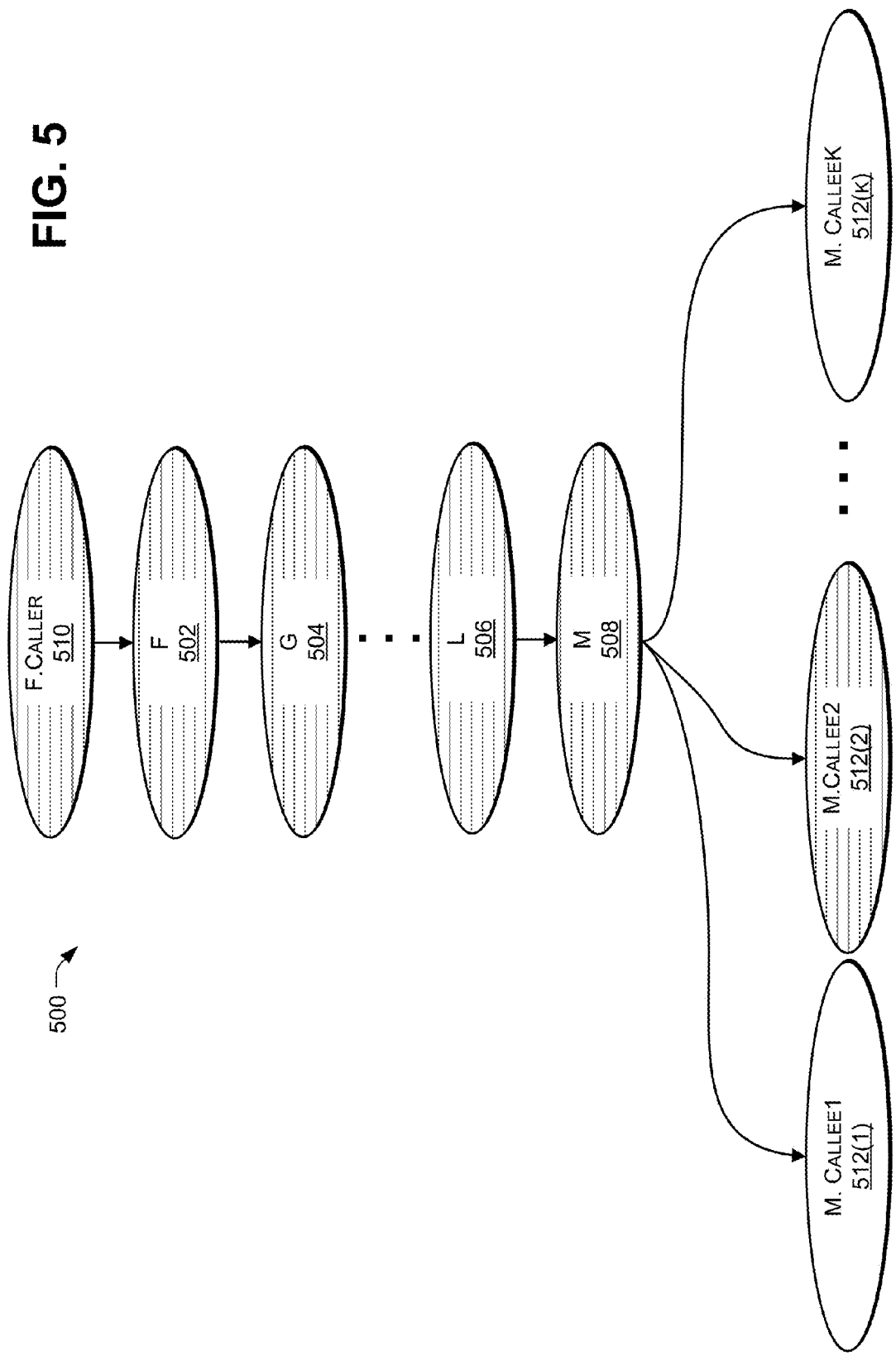
FIG. 5 illustrates an example of a trigram stack for a proxy root cause as employed by cross-trace scalable issue detection and clustering according to some implementations.

FIG. 5 illustrates an example of a trigram stack for a proxy root cause as employed by cross-trace scalable issue detection and clustering according to some implementations.

As illustrated in FIG. 5, although M, shown at 508, is not directly called by F.Caller 510, it is repeatedly called indirectly. In this case, by shifting the focus from F at 502 to M at 508, M is successfully located as the proxy root cause by using the two conditions on $\alpha$ and $\beta$ together with the condition $T(M).\gamma \ll 1$. Accordingly, F at 502 may be identified as the real root cause from the proxy M at 508, such as in post analysis. Similar to the discussion regarding the second example, if none of M.Callees 512 is the root cause, then the total amount of CPU usage of these callees, M.Callee1, M.Callee2, through M.CalleeK as shown at 512(1), 512(2), and 512(K), respectively, may be a small portion of M.Usage.

In accordance with the example discussed above, a trigram stack is an effective root-cause representation of performance issues such as the example CPU consumption issues shown when it satisfies the three conditions set forth in Expression 4.

$$\begin{cases} 1. & \beta \text{ is large;} \\ 2. & \alpha \to 1; \\ 3. & \gamma \ll 1. \end{cases} \quad (4)$$

Figure 6:
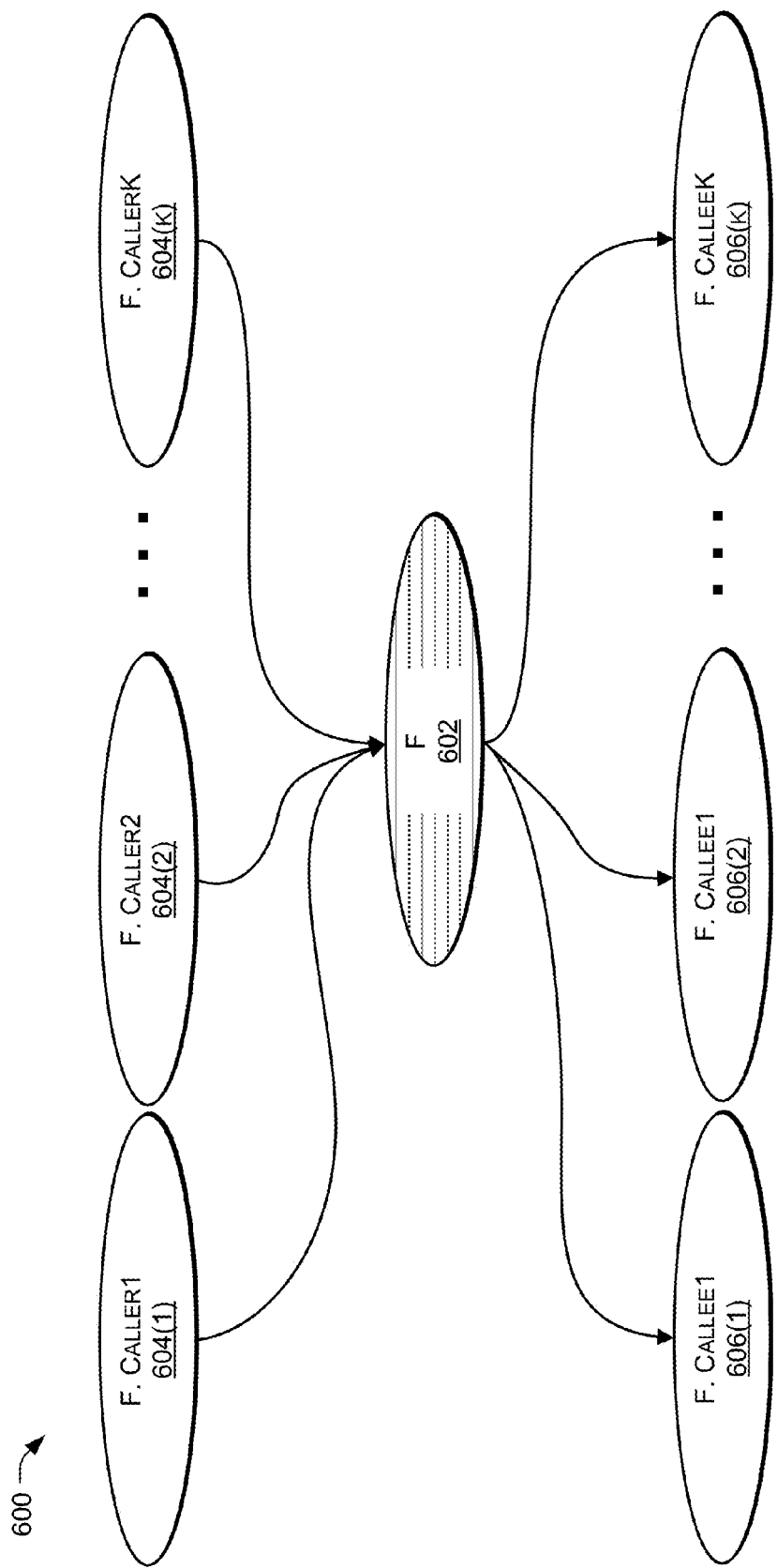
FIG. 6 illustrates an example of a butterfly model as defined by cross-trace scalable issue detection and clustering according to some implementations.

Due to the complexity of modern operating systems and the high parallelism of multi-tasking, the execution information of a large number of OS related processes and/or applications may be recorded in a single trace for performance analysis. If a function of a module is the root-cause of a performance problem, then it is likely to impact multiple callers and be involved in the execution of different processes. This is particularly true for shared OS modules and services as well as the common components within applications. Leveraging this observation, the cross-trace scalable issue detection and clustering techniques described herein take a holistic view of a shared root-cause in the CPU usage tree and combine trigrams that share the same root-cause function to define a cross-trace similarity model such as a Butterfly model as shown in FIG. 6.

To define such a Butterfly model as shown at 600, the trigram stacks with the same middle node function T.B are aligned on the middle node function as shown at 602, and the caller functions and callee functions are merged at 604 and 606, respectively. As shown in FIG. 6, the resultant structure is a combination of an upside-down caller sub-tree made up of nodes 604(1), 604(2), through 604(K), and a callee sub-tree made up of nodes 606(1), 606(2), through 606(K), joined by the root-cause function T.B at 602 in the middle. This structure is named Butterfly due to its resemblance to a butterfly. $S(X)=\{T|T.B=X\}$ is used to represent the set of trigram stacks with the same T.B in various implementations. The Butterfly of S(X) as shown at 600 is formalized using an abstract merge function such as the function shown in Equation 5.

$$\text{Butterfly}(X) = \text{Merge}(S(X)) \quad (5).$$

Equation 5 is defined by the dimensions of trigram vector T. The first three dimensions of trigram vector T are symbol variables. The merge of the symbol variables takes the union of those variables. The last three dimensions of T are numerical values and they are merged using the algorithm shown in Table 7.

TABLE 7

1. Values of F.Caller.Usage may be merged for the same F.Caller symbol. The merged value is the weighted average of each F.Caller.Usage with the corresponding F.Usage as weight.
2. Values of F.Callee.Usage are merged using the same rule as F.Caller.Usage.
3. Values of F.Usage are merged across all of the trigram stacks. If two trigram stacks are not on the same path of the CPU usage tree, i.e. there is no direct or indirect dependency of function calls, the values of F.Usage are added. Otherwise, the larger F.Usage is selected as the merged value.

Butterfly is a medium level representation of the root-cause for performance issues such as CPU consumption issues, issues with disk I/O, network delay, etc. It characterizes a local feature representation due to the discriminating trigram stacks; and it also has global characteristics because it combines the overall impact of each root-cause.

The top S most significant Butterflies may be selected as the representation of a given trace. The significance of Butterflies is ranked by the merged value of F.Usage. The parameter S may be determined in an experimental approach in some embodiments. For example, in different embodiments, S may be determined as a percentage of the total number of Butterflies, as a predetermined value, as a dynamic value, as separate values for different traces, or as combinations thereof In various example implementations, S=500 was selected as a fixed global parameter. If the parameter S selected is improperly large the discrimination of the trace dissimilarity metric will decrease, while if the parameter S selected is improperly small Butterflies that represent the root-cause may be missed.

Based on the carefully designed trigram and Butterfly representations, the dissimilarity metric of traces can be well defined based on the dissimilarities of trigram and Butterfly, respectively. Different mathematical functions can be used to measure the dissimilarities as long as the functions can reflect the discrimination of the conditions in Expression (4). An example of a set of functions selected for several implementations are shown in Equations 6-9, which define dissimilarity of trigram stacks $S_1$ and $S_2$.

$$D_A(S_1, S_2) = [\delta_A(S_1 \cdot A, S_2 \cdot A) \cdot (S_1 \cdot \alpha, S_2 \cdot \alpha)]^2. \quad (6)$$

$$D_B(S_1, S_2) = e^{[Sigmoid(\mu,\lambda,S_1 \cdot \beta) - Sigmoid(\mu,\lambda,S_2 \cdot \beta)]^2}. \quad (7)$$

$$D_C(S_1, S_2) = [\delta_C(S_1 \cdot C, S_2 \cdot C) \cdot (S_2 \cdot \gamma, S_2 \cdot \gamma)]^2. \quad (8)$$

$$D(S_1, S_2) = \sqrt{\frac{D_B}{e} \cdot \frac{D_A + D_C}{\delta_A^2 + \delta_C^2}}. \quad (9)$$

The dissimilarities are normalized to the range [0,1], where $\delta_A$ and $\delta_C$ are Dirac Delta functions with different amplitude, i.e., $$\delta_A(x, y) = \begin{cases} \delta_A, & x = y \\ 0, & x \neq y; \end{cases}$$

and $$Sigmoid(\mu, \lambda, x) = \frac{1}{1 + e^{-\lambda(x-\mu)}}.$$

To separate CPU usage into high and low regions, $\mu$ may be used as a threshold. However, in some instances, to define higher correlation within the same region a Sigmoid function is selected rather than a threshold function because the Sigmoid function smoothly distinguishes the levels of significance between high CPU usage and low CPU usage. In at least one implementation for $S_1$ and $S_2$, where $S_1.B=S_2.B$, $\delta_A=\delta_C=10.0$, $\lambda=1.0$, $\mu=0.3$.

Dissimilarity of two Butterflies may be defined based on the Top-n similar trigram stacks of the Butterflies. n-bipartite matching may be conducted based on the D function. In various implementations selection of n=1 generates results that are as effective as using a larger n. Accordingly, the most significant trigram stack in the Butterfly may be used as a representation for trace correlation. An example of a function selected for several implementations is shown in Equation 10, which defines dissimilarity of Butterflies $B_1$ and $B_2$.

$$D(B_1, B_2) = \min_n \{BiMapping(\{S_1\}, \{S_2\})\} \quad (10).$$

When larger n are used, a higher weight is given to the mutual effect resulting in more strict correlation definitions and smaller clusters. An example of a function selected for several implementations is shown in Equation 11, which defines dissimilarity of traces $T_1$ and $T_2$ where C={B|B.F$\in$T$_1$ and B.F$\in$T$_2$}.

$$D(T_1, T_2) = \frac{\sum_{B \in C} \min\{B_1 \cdot \beta, B_2 \cdot \beta\} \cdot D(B_1, B_2) + \sum_{B \notin C} B \cdot \beta \cdot 1.0}{\sum_{B \in C} \min\{B_1 \cdot \beta, B_2 \cdot \beta\} + \sum_{B \notin C} B \cdot \beta}. \quad (11)$$

The dissimilarity of two traces is the weighted dissimilarity of their Butterflies. In addition, the dissimilarity of two traces is normalized to [0,1]. If a Butterfly appears in only one trace, clustering logic 104 assigns a default dissimilarity of 1.0 as its contribution dissimilarity metric 116.

The dissimilarity metric 116 may be used to correlate traces based on the root-cause of performance issues such as the CPU consumption issues shown because root-cause is vigilantly addressed in the design of the trigram stack and Butterfly. Cross-trace scalable issue detection and clustering carries out correlation analysis by conducting hierarchical clustering based on the trace dissimilarity in various implementations.

Compared with distance metrics, the dissimilarity definition employed is both self-identical and symmetric. In order to verify the clustering stability based on this dissimilarity metric, clustering from two opposite directions, agglomerative and divisive, may be conducted. Consistent results obtained in testing following the two procedures demonstrate that the dissimilarity metric 116 is well defined and effective.

Example Process

Figure 7:
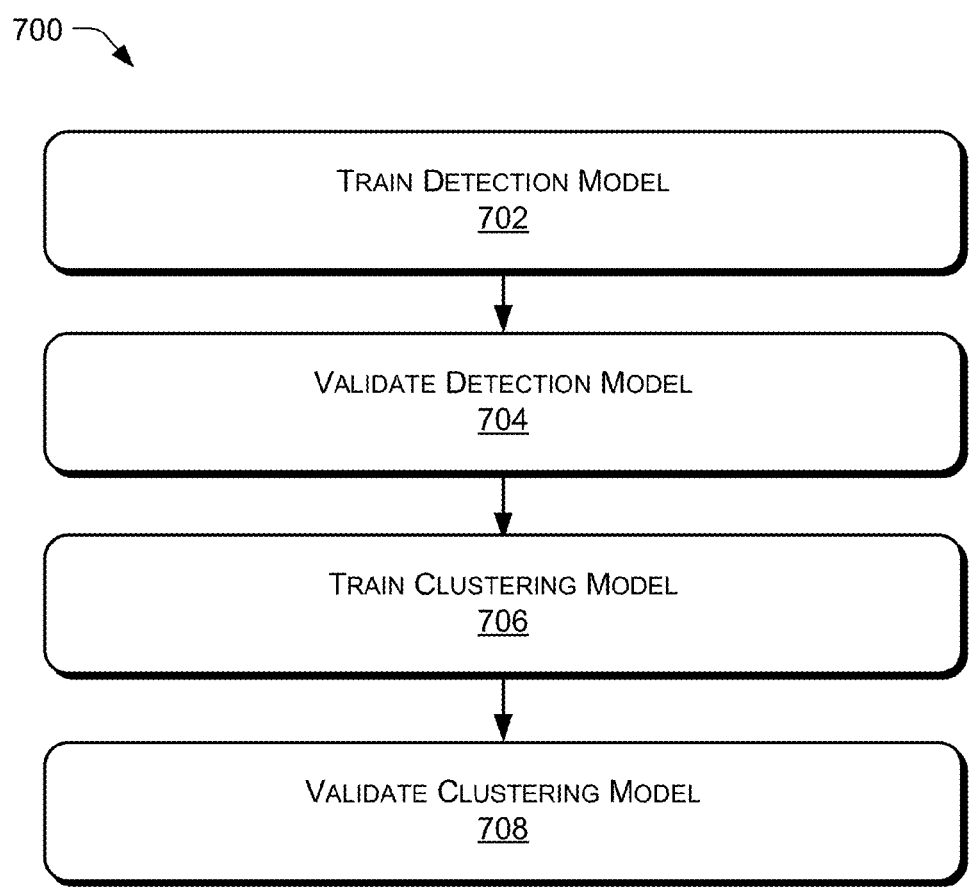
FIGS. 7 and 8 are flow diagrams illustrating an example process for cross-trace scalable issue detection and clustering in various embodiments.
Figure 8:
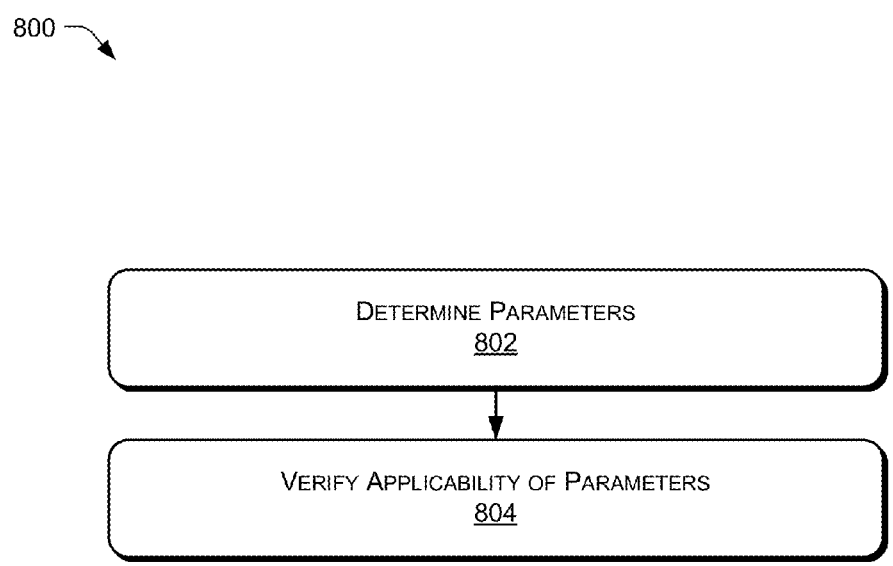

FIGS. 7 and 8 are flow diagrams illustrating an example processes for cross-trace scalable issue detection and clustering in various embodiments. In the flow diagrams of FIGS. 7 and 8, each block represents one or more operations that can be implemented in hardware, software, or a combination thereof In the context of software, the blocks represent computer-executable instructions that, when executed by one or more processors, cause the processors to perform the recited operations. Generally, computer-executable instructions include routines, programs, objects, components, data structures, and the like that perform particular functions or implement particular abstract data types. The order in which the blocks are described is not intended to be construed as a limitation, and any number of the described operations can be combined in any order and/or in parallel to implement the process. For discussion purposes, the processes 700 and 800 are described with reference to the frameworks 100 of FIGS. 1 and 300 of FIG. 3, although other frameworks, devices, systems and environments may implement this process.

FIG. 7 presents process 700, which includes, at 702, detection model training 310 of training logic 302 training a detection model in accordance with detection logic 102 using labeled traces 308. For example, in some implementations CPU consumption 110(1) is trained using labeled traces 308. The measures Precision and Recall may be used to evaluate effectiveness of issue detection in some implementations of cross-trace scalable issue detection and clustering where $S_{TP}$={true positive: traces with CPU consumption issue labeled by analysts} and $S_{DP}$={detected positive: traces with CPU consumption issue detected by algorithm} consistent with equations 12 and 13 presented below.

$$Precision = \frac{|S_{TP} \cap S_{DP}|}{|S_{DP}|}. \quad (12)$$

$$Recall = \frac{|S_{TP} \cap S_{DP}|}{|S_{DP}|}. \quad (13)$$

Cross-trace scalable issue detection and clustering employs a high recall ratio for cross-trace analysis in several implementations. For example, although some negative samples may be tolerated as noise, missing a significant percentage of traces with CPU consumption issues should be avoided. At 704, detection model 314 may be validated, for example by using cross-validation.

At 706, clustering model training 316 of training logic 302 training a clustering model is shown in accordance with clustering logic 104 using labeled traces 308. In various implementations the parameters of clustering model 318 are determined from labeled traces 308. For example, in some implementations, CPU consumption issue detection is conducted against the full data set using the validated detection model obtained from 704, and clustering is completed on the traces having a detected CPU consumption issue.

At 708, to validate the applicability of the clustering model, the clustering result may be compared with the clusters labeled by analysts in the labeled traces 308. The measures Precision and Recall also may be used to evaluate effectiveness of clustering in some implementations of cross-trace scalable issue detection and clustering.

FIG. 8 presents process 800 for root-cause clustering. Process 800 includes, at 802, determining the parameters of the clustering model 318 from labeled traces 308. The parameters to be determined include parameters in the dissimilarity metric 116 and parameters for hierarchical clustering. In accordance with Equations 6 and 7, four parameters are determined for the dissimilarity metric 116, i.e., $\delta_A$, $\delta_C$, $\lambda$, $\mu$. In addition, one parameter, $\Phi$, is determined as a stop condition, the diameter of a cluster boundary for both agglomerative and divisive clustering. Another parameter, $\Pi$, the number of initial clusters is determined for divisive clustering. $\Phi$ is dependent on $\delta_A$, $\delta_C$, $\lambda$, $\mu$. As long as $\delta_A$, $\delta_C$, $\lambda$, $\mu$ are in an appropriate range, the quality of the clustering result is not sensitive to $\delta_A$, $\delta_C$, $\lambda$, $\mu$; however it is sensitive to $\Phi$. Heuristically, $\delta_A=\delta_C=10.0$, $\lambda=1.0$, $\mu=0.3$ are selected, and $\Phi$ and $\Pi$ are determined via a grid search. The criteria of the grid search for selection of model parameters are Clustering Precision and Clustering Recall where $S_R=\{$traces in the correct cluster that represent their root-cause$\}$;

$S_C=\{$(traces in the clusters with size$\geq 2\}$; and $S_L=\{$traces having other occurrences that trace to the same root-cause$\}$ as defined in Equations 14 and 15.

$$\text{Clustering Precision} = \frac{S_R}{S_C}. \quad (14)$$

$$\text{Clustering Recall} = \frac{S_R}{S_L}. \quad (15)$$

Using the definition of Clustering Precision and Clustering Recall above, a grid search for parameters $\Phi$ and $\Pi$ is conducted on a small, labeled set such as labeled traces 308. In at least one implementation, for example, from parameters $\Phi=0.75$ and $\Pi\geq 10$, the combination of precision and recall obtained is Clustering Precision=80.7% and Clustering Recall=73.9%.

At 804, applicability of the selected parameters is verified. For example, applicability of the parameters may be verified by examining the clustering result on the full data set, e.g., the labeled traces 308 and the unlabeled traces 322. Clustering is conducted on the portion of the traces in which an issue is detected. For example, in a test of one implementation, detection was performed on 3000 traces. Of the 3000 traces, 993 positively indicated the existence of a performance issue, which in this case was a CPU consumption issue. Clustering the 993 traces using the parameters discussed above resulted in 619 traces in 164 clusters where the minimum number of traces in a cluster was two and the maximum was sixteen. For the 164 clusters, analysts manually verified the correlations in each cluster with the result being comparable to the number on the labeled traces 308 at Clustering Precision=72.4%. Getting the Clustering Recall number on the full data set would require labeling the root cause of each trace in the full data set, which was outside the time parameters of the test. Thus, the labeled traces 308 were chosen as a sample to calculate Clustering Recall. The calculated result was a recall ratio, Clustering Recall=73.9%.

The above framework and process for cross-trace scalable issue detection and clustering may be implemented in a number of different environments and situations. Further, while several examples are described herein for explanation purposes, the disclosure is not limited to the specific examples, and can be extended to additional devices, environments, applications and settings.

Example Architecture

Figure 9:
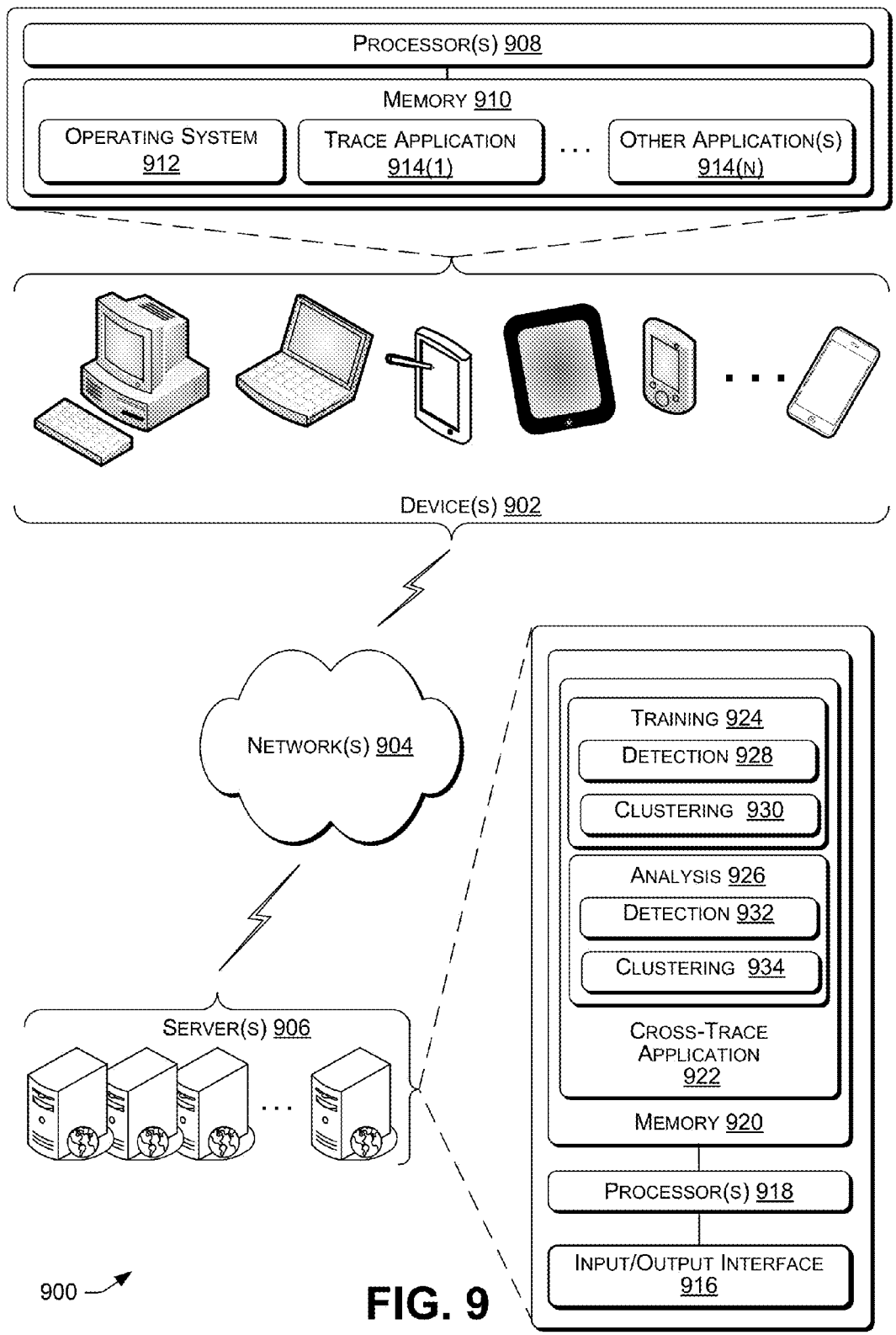
FIG. 9 illustrates an example architecture including a hardware and logical configuration of a computing device according to some implementations.

FIG. 9 illustrates an example architecture 900 including a hardware and logical configuration of devices that may implement techniques facilitating cross-trace scalable issue detection and clustering according to some implementations.

The architecture 900 may include a variety of devices 902 that via a network 904 provide trace data to other computing devices including server(s) 906. As illustrated, a device 902 includes one or more processors 908 and memory 910, which may include an operating system 912, and one or more applications including a trace application 914(1), and other applications 914(N) running thereon.

In various embodiments devices 902 are embodied as computing devices such as a personal computer, a laptop-style personal computer, a personal digital assistant (PDA), a thin client, a mobile telephone, a portable music player (not shown) or any other sort of suitable computing device and may also include servers such as a server 906. Devices 902 and/or servers 906 may include communication interfaces for exchanging data with other devices, such as via a network, direct connection, and so forth. The communication interfaces can facilitate communications within a wide variety of networks and protocol types, including wired networks (e.g., LAN, cable, etc.) and wireless networks (e.g., WLAN, cellular, satellite, etc.), the Internet and the like, which are not enumerated herein. Devices 902 and/or servers 906 may also include at least one display device, which may be any know display device such as an LCD or CRT monitor, television, projector, touch screen or other display or screen other devices, and input/output devices, which may include a mouse and a keyboard, as well as various other input devices, such as a remote controller, a camera, microphone, a joystick, and so forth, and output devices, such as speakers, printers, and the like that are able to communicate through a system bus or other suitable connection, which are not enumerated herein. The memory 910, meanwhile, may include computer-readable storage media in the form of volatile memory, such as Random Access Memory (RAM) and/or non-volatile memory, such as Read Only Memory (ROM) or flash RAM.

Operating system 912 may further include other operating system components, such as a user interface component, a kernel, and so forth. Additionally, operating system 912 may include a system API for use by the trace application 914(1) in collecting user interaction information, system information, and other trace telemetry in accordance with the implementations described herein. Further, memory 910 may include other modules, such as device drivers, and the like, as well as other data, such as data used by other applications 914(N). In addition, in other implementations, trace application 914(1) may be included as a component of operating system 912 and/or may be a component of another application, or the like.

The applications 914(1)-(N) may comprise desktop applications, web applications provided over a network such as network 904, and/or any other type of application capable of running on the device 902. The network 904, meanwhile, may represent a combination of multiple different types of networks, interconnected with each other and functioning as a single large network (e.g., the Internet or an intranet). The network 904 may include wire-based network components (e.g., cable) and wireless network components (e.g., cellular, satellite, etc.).

A server 906 includes an input/output interface 916 coupled to one or more processors 918 and memory 920, which, in addition to an operating system (not shown) may include a cross-trace application 922 including a training component 924 and an analysis component 926. In accordance with cross-trace scalable issue detection and clustering as described herein, training component 924 may include a detection component 928 and a clustering component 930. Meanwhile, analysis component 926 may include a detection component 932 and a clustering component 934. Other applications (not shown) may also run on server 906. In addition, memory 920 may include computer-readable storage media in the form of volatile memory, such as Random Access Memory (RAM) and/or non-volatile memory, such as Read Only Memory (ROM) or flash RAM. The components in memory 920 may correspond to and implement the logic described at 100 and 300 of FIGS. 1 and 3, respectively.

Processors 908 and 918 may each be a single processing unit or a number of processing units, all of which may include single or multiple computing units or multiple cores. The processors 908 and 918 can be implemented as one or more microprocessors, microcomputers, microcontrollers, digital signal processors, central processing units, state machines, logic circuitries, and/or any devices that manipulate signals based on operational instructions. Among other capabilities, the processors 908 and 918 can be configured to fetch and execute computer-readable instructions stored in memory 910 or 920, or other storage media.

Other storage media may include computer-readable storage media for storing instructions which are executed by the processors 908 or 918 to perform the various functions described above. For example, other storage media may generally include memory and memory devices, such as both volatile memory and non-volatile memory (e.g., RAM, ROM, or the like). Further, other storage media may also include one or more mass storage devices, such as hard disk drives, solid-state drives, removable media, including external and removable drives, memory cards, Flash memory, floppy disks, optical disks (e.g., CD, DVD), storage arrays, storage area networks, network attached storage, or the like, or any combination thereof. Thus, storage media may be collectively referred to as memory or computer-readable storage media herein. Storage media is capable of storing computer-readable, processor-executable program instructions as computer program code that can be executed on a processor such as processors 908 or 918 to configure a device as a particular machine for performing the operations and functions described in the implementations herein.

Memory 920 may include components and/or modules embodying logic described with regard to FIG. 3, which can be executed on the processor 918 for implementing the cross-trace scalable issue detection and clustering functions and algorithms described herein although they are not individually shown in FIG. 9, for clarity. Training component 924 corresponds to training logic 302 discussed above, such as with respect to FIG. 3, and may include a detection model training component corresponding to detection model training logic 310, a clustering model training component corresponding to clustering model training logic 316, trained model components corresponding to trained model logic 312 and including trained detection and clustering models corresponding to detection model 314 and clustering model 318, a feedback and improvement component corresponding to feedback and improvement logic 320. Meanwhile, analysis component 926 corresponds to analysis logic 304, and may include a trace categorization component corresponding to trace categorization logic 224, a trace clustering component corresponding to trace clustering logic 228, a prioritized analysis component corresponding to prioritized analysis logic 330, and a performance bug filing component corresponding to performance bug logic 306. In addition, memory 920 may include an operating system which is not shown in FIG. 9 for clarity.

The example environments, systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer-readable storage devices. Thus, the processes, components and modules described herein may be implemented by a computer program product.

Although illustrated in FIG. 9 as being stored in memory 910 or 920, components 914(1) and/or 922, or portions thereof, may be implemented using any form of computer-readable media that is accessible by devices 902 and/or 906. Computer-readable media may include, for example, computer storage media and communications media. Computer storage media is configured to store data on a tangible medium, while communications media is not.

As mentioned above, computer storage media includes volatile and non-volatile, removable and non-removable media implemented in any method or technology for storage of information, such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store information for access by a computing device.

In contrast, communication media may embody computer readable instructions, data structures, program modules, or other data in a modulated data signal, such as a carrier wave, or other transport mechanism.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Conclusion

Although the subject matter has been described in language specific to structural features and/or methodological acts, the subject matter defined in the appended claims is not limited to the specific features or acts described above. Rather, the specific features and acts described above are disclosed as example forms of implementing the claims. This disclosure is intended to cover any and all adaptations or variations of the disclosed implementations, and the following claims should not be construed to be limited to the specific implementations disclosed in the specification. Instead, the scope of this document is to be determined entirely by the following claims, along with the full range of equivalents to which such claims are entitled.

We claim:

1. A computer storage medium having computer-executable instructions encoded thereon, the computer-executable instructions, programmed as modules for machine learning, the modules comprising:
    an interface module configured to obtain a plurality of traces, the plurality of traces being collected from at least two types of releases, the types of releases including: beta releases, release to manufacturing (RTM) releases, and release to end user system releases;
    a detection module configured to detect a subset of traces indicating performance issues from the plurality of traces obtained;
    a performance issue category module configured to categorize detected performance issues into one or more of a plurality of performance issue categories; and
    a clustering module configured to identify a root-cause of the detected performance issues, wherein the clustering module is further configured to define clusters based on a shared root cause of the detected performance issues being common between at least two of the subset of traces.

2. A computer storage medium as recited in claim 1, wherein the detection module is further configured to represent a trace of the subset of traces indicating performance issues as a trigram stack.

3. A computer storage medium as recited in claim 1, wherein the clustering module is further configured to define a dedicated clustering model including a feature representation module and a dissimilarity metric that correspond to selected of the plurality of performance issue categories.

4. A computer storage medium as recited in claim 1, wherein the clustering module is further configured to employ the dissimilarity metric for cross-trace analysis.

5. A computer storage medium as recited in claim 1, wherein the detection module is further configured to initiate semi-supervised machine learning that includes supervised learning in a training phase to detect the performance issues from the subset of traces indicating performances issues.

6. A computer storage medium as recited in claim 1, wherein the clustering module is further configured to initiate semi-supervised machine learning that includes supervised learning in a training phase to define a clustering model.

7. A method comprising:
    automatically detecting a performance issue from a trace;
    representing the trace with at least one butterfly of a trigram stack;
    determining a root-cause of the performance issue;
    clustering a plurality of traces including the trace based on the plurality of traces sharing the root-cause of the performance issue; and
    defining a butterfly model based on trigram stacks and clusters corresponding to a shared root-cause of a subset of the plurality of traces.

8. A method as recited in claim 7, wherein the performance issue includes a CPU consumption issue.

9. A method as recited in claim 7, wherein the performance issue includes a disk I/O issue.

10. A method as recited in claim 7, wherein the performance issue includes a network delay issue.

11. A method as recited in claim 7, wherein the root-cause is determined at a computer-executable function level.

12. A method as recited in claim 7, wherein the plurality of traces are collected from at least one of a plurality of product beta releases or a plurality of release to manufacturing (RTM) releases.

13. A method as recited in claim 7, further comprising employing a dissimilarity metric for cross-trace analysis.

14. A method as recited in claim 7, further comprising using machine learning to scale-up analysis of the plurality of traces.

15. A method as recited in claim 7, further comprising:
    using machine learning to scale-up analysis of the plurality of traces; and
    employing semi-supervised learning including supervised learning in a training phase for issue detection.

16. A method as recited in claim 7, further comprising:
    using machine learning to scale-up analysis of the plurality of traces; and
    employing semi-supervised learning including supervised learning in a training phase for defining a clustering model.

17. A computer storage medium having processor-executable instructions encoded thereon, the processor-executable instructions, upon execution, programming a computer to perform the method of claim 7.

18. An apparatus comprising:
    a processor;
    a memory operably coupled to the processor and having processor-executable instructions embodied thereon, the processor-executable instructions, upon execution by the processor, configuring the apparatus to perform the method of claim 7.

19. A computing device comprising:
    a processor in communication with storage media;
    a training component configured by training logic to perform machine learning operations including detection model training and clustering model training to generate a trained model for a performance issue; and
    an analysis component configured by analysis logic to employ the trained model to perform operations including trace categorization for the performance issue and trace clustering based on a shared root-cause of the performance issue.

20. A computing device according to claim 19, wherein the analysis component is further configured to facilitate prioritized analysis based on cluster size.

* * * * *